(12) United States Patent
Arce

(10) Patent No.: US 10,781,788 B2
(45) Date of Patent: Sep. 22, 2020

(54) WIND TURBINE BLADE

(71) Applicant: LM WP PATENT HOLDING A/S, Kolding (DK)

(72) Inventor: Carlos Arce, Kolding (DE)

(73) Assignee: LM WP PATENT HOLDING A/S, Kolding (DK)

( * ) Notice: Subject to any disclaimer, the term of this patent is extended or adjusted under 35 U.S.C. 154(b) by 271 days.

(21) Appl. No.: 15/317,218

(22) PCT Filed: Jul. 3, 2015

(86) PCT No.: PCT/EP2015/065233
§ 371 (c)(1),
(2) Date: Dec. 8, 2016

(87) PCT Pub. No.: WO2016/001420
PCT Pub. Date: Jan. 7, 2016

(65) Prior Publication Data
US 2017/0107970 A1    Apr. 20, 2017

(30) Foreign Application Priority Data

Jul. 3, 2014   (EP) .................................... 14175557

(51) Int. Cl.
*F03D 1/06*    (2006.01)

(52) U.S. Cl.
CPC ........ *F03D 1/0641* (2013.01); *F05B 2230/23* (2013.01); *F05B 2240/12* (2013.01); *F05B 2240/121* (2013.01); *F05B 2240/122* (2013.01); *F05B 2240/21* (2013.01); *F05B 2240/30* (2013.01); *Y02E 10/721* (2013.01); *Y02P 70/523* (2015.11)

(58) Field of Classification Search
CPC ............ F05B 2240/12; F05B 2240/121; F05B 2240/122; F05B 2240/21; F05B 2240/30; F05B 2250/183; F05B 2260/96; F03D 1/0608; F03D 1/0633; F03D 1/0641; F03D 1/0675; Y02E 10/721; Y02P 70/523
USPC .................................. 416/223 R, 228, 236 R
See application file for complete search history.

(56) References Cited

U.S. PATENT DOCUMENTS

| 1,446,011 | A | * | 2/1923 | Jackson | ................... | B63H 1/28 |
| | | | | | | 416/236 A |
| 2,010,094 | A | * | 8/1935 | Leinweber | .............. | B64C 11/16 |
| | | | | | | 416/236 A |

(Continued)

FOREIGN PATENT DOCUMENTS

| DE | 102010026588 | * | 1/2012 | ........... F03D 1/0641 |
| EP | 1112928 A2 | * | 7/2001 | ................ B64C 9/18 |

(Continued)

*Primary Examiner* — John M Zaleskas
(74) *Attorney, Agent, or Firm* — Nath, Goldberg & Meyer; Jerald L. Meyer; Tanya E. Harkins

(57) ABSTRACT

A wind turbine blade is described having a serrated trailing edge. Flow straightening vanes are provided on the serrations, to prevent a lateral or side flow over the edges of the serrations, which are preferably provided at incidence to the flow over the wind turbine blade. The vanes can be formed integrally with the serrations, or attached to existing serrations as a retrofit solution. The serrations with the vanes can be provided as a trailing edge panel for attachment to the trailing edge of an existing wind turbine blade.

18 Claims, 6 Drawing Sheets

(56) References Cited

U.S. PATENT DOCUMENTS

| | | | | |
|---|---|---|---|---|
| 2,265,788 | A * | 12/1941 | Wolf, Sr. | B64C 11/16 416/205 |
| 5,088,665 | A * | 2/1992 | Vijgen | B64C 23/06 244/198 |
| 8,047,784 | B2 * | 11/2011 | Bonnet | F03D 1/0675 416/1 |
| 2003/0099546 | A1 * | 5/2003 | Stiesdal | F03D 1/0641 416/228 |
| 2003/0175121 | A1 * | 9/2003 | Shibata | F03D 1/0641 416/131 |
| 2006/0018759 | A1 | 1/2006 | Moser | |
| 2006/0280614 | A1 * | 12/2006 | Quell | F03D 1/0633 416/236 R |
| 2008/0187442 | A1 * | 8/2008 | Standish | F03D 1/065 416/235 |
| 2009/0016891 | A1 * | 1/2009 | Parsania | F03D 1/0675 416/223 R |
| 2009/0068018 | A1 * | 3/2009 | Corten | F03D 1/0641 416/223 R |
| 2009/0087314 | A1 * | 4/2009 | Haag | F03D 1/0633 416/147 |
| 2010/0143144 | A1 * | 6/2010 | Anjuri | F03D 1/06 416/228 |
| 2011/0142635 | A1 * | 6/2011 | Fritz | F03D 1/0675 416/62 |
| 2011/0142665 | A1 * | 6/2011 | Huck | F03D 1/0633 416/228 |
| 2011/0211966 | A1 * | 9/2011 | Watts | F03D 1/0633 416/223 R |
| 2011/0223030 | A1 * | 9/2011 | Huck | F03D 1/0675 416/228 |
| 2011/0229321 | A1 | 9/2011 | Kilaras | |
| 2011/0268558 | A1 * | 11/2011 | Driver | F03D 80/00 415/119 |
| 2012/0027590 | A1 * | 2/2012 | Bonnet | F03D 1/0641 416/1 |
| 2012/0051936 | A1 * | 3/2012 | Eisenberg | F03D 1/0633 416/235 |
| 2012/0134817 | A1 * | 5/2012 | Bagepalli | F03D 1/0675 416/62 |
| 2013/0146715 | A1 * | 6/2013 | Domel | B64C 21/10 244/199.4 |
| 2013/0323070 | A1 * | 12/2013 | Grabau | F03D 1/0675 416/229 R |
| 2015/0078896 | A1 * | 3/2015 | Oerlemans | F03D 1/0608 416/1 |
| 2015/0176564 | A1 * | 6/2015 | Kumar | F03D 1/0675 416/236 R |
| 2015/0247487 | A1 * | 9/2015 | Oerlemans | F03D 1/0675 416/146 R |
| 2015/0267678 | A1 * | 9/2015 | Obrecht | F03D 1/0633 416/228 |
| 2015/0292476 | A1 * | 10/2015 | Obrecht | F03D 1/0633 416/228 |

FOREIGN PATENT DOCUMENTS

| | | | | |
|---|---|---|---|---|
| EP | 1314885 A1 | | 5/2003 | |
| GB | 2186033 A | * | 8/1987 | ........... F03D 1/0608 |
| WO | WO 2013020959 A1 | * | 2/2013 | ........... F03D 1/0608 |
| WO | WO-2014044412 A1 | * | 3/2014 | ........... F03D 1/0675 |
| WO | WO 2014198754 A1 | * | 12/2014 | ........... F03D 1/0633 |
| WO | WO 2015192915 A1 | * | 12/2015 | ............ F03D 80/00 |

* cited by examiner

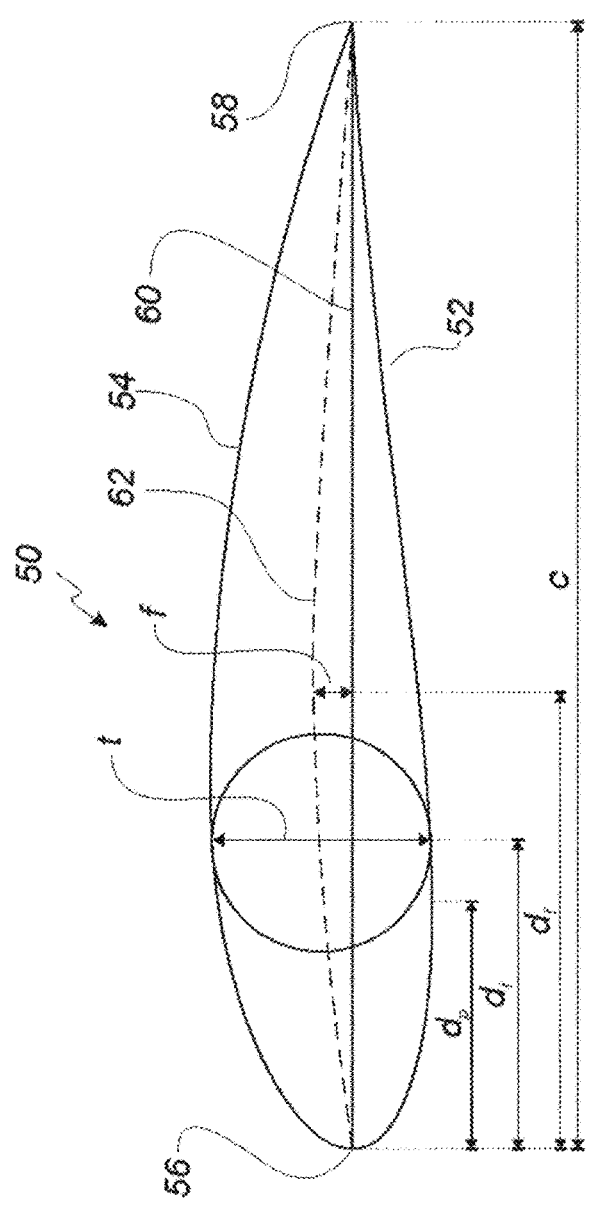
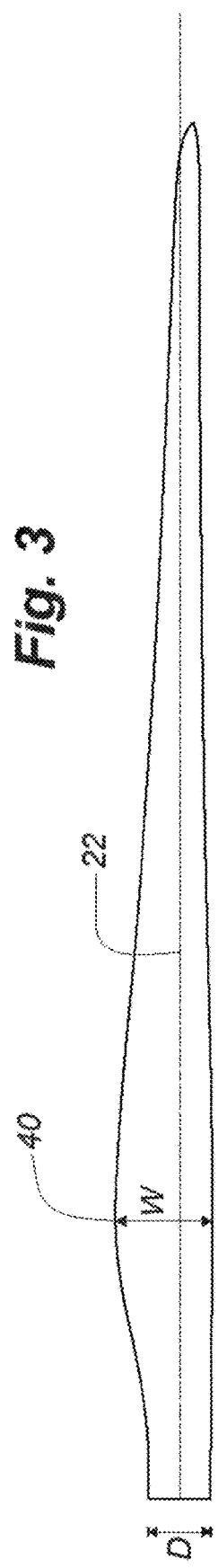
Fig. 3
Fig. 4

WIND TURBINE BLADE

This is a National Phase Application filed under 35 U.S.C. 371 as a national stage of PCT/EP2015/065233, filed Jul. 3, 2015, an application claiming the benefit of European Application No. 14175557.9, filed Jul. 3, 2014, the content of each of which is hereby incorporated by reference in its entirety.

FIELD OF THE INVENTION

The present invention relates to a wind turbine blade having trailing edge serrations.

BACKGROUND OF THE INVENTION

Wind turbine blades are sometimes provided with serrations along the blade trailing edges, in an effort to reduce blade trailing edge noise and/or to improve wind turbine blade efficiency, as can be seen in EP1314885.

Figure 5:
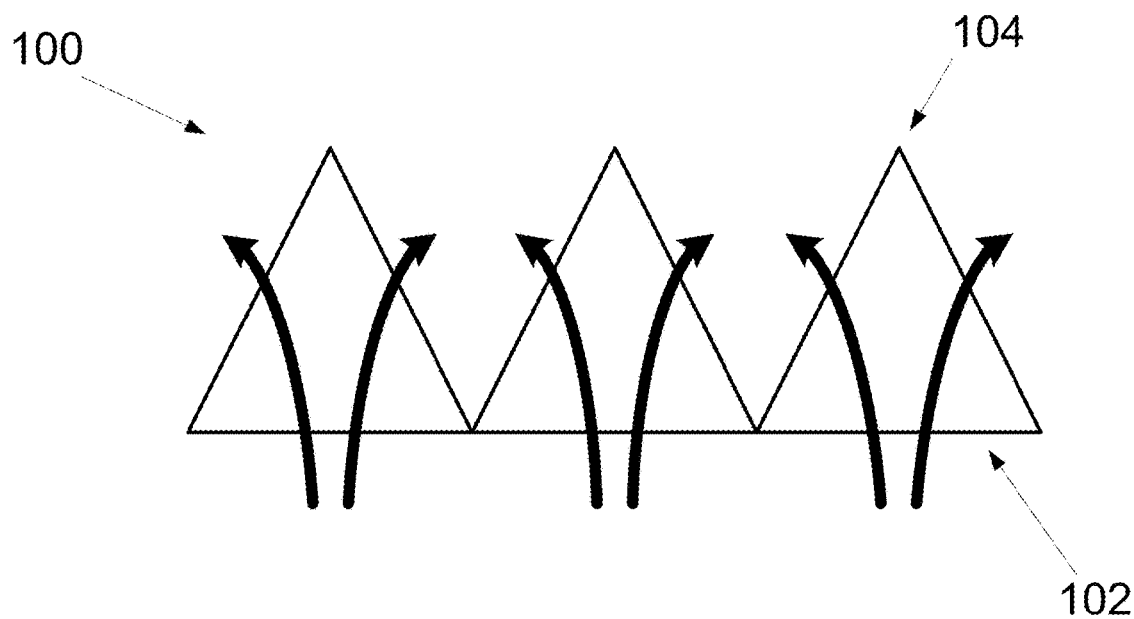

With reference to FIG. 5, an enlarged view of a set of serrations is indicated at 100, the serrations 100 comprising a base end 102 arranged at the trailing edge of a wind turbine blade and an apex or tip end 104. During operation of a wind turbine having such a wind turbine blade, the airflow over the serrations 100—as indicated by the arrows in FIG. 5—can flow in a lateral direction, to the sides of the serrations. Accordingly, the flow can exit the serrations at a different angle of incidence to the designed incidence angle. The effect can be even more pronounced for cases where the trailing edge serrations are arranged at incidence to the direction of flow at the blade trailing edge.

As a result, the effectiveness of the serrations 100 is diminished, due to the lack of control of flow angle.

It is an object of the invention to provide a wind turbine blade having an improved trailing edge configuration.

SUMMARY OF THE INVENTION

Accordingly, there is provided a wind turbine blade having a profiled contour including a pressure side and a suction side, and a leading edge and a trailing edge with a chord having a chord length extending therebetween, the wind turbine blade extending in a spanwise between a root end and a tip end, the wind turbine blade comprising a plurality of serrations provided along at least a portion of the trailing edge of the blade,
   wherein the wind turbine blade further comprises at least one flow straightening vane projecting from a surface of said serrations, said at least one flow straightening vane arranged to straighten flow over said surface of said serrations.

The flow straightening vane or vanes act as a flow barrier to prevent lateral flow over the blade serrations, the vane or vanes accordingly aligning the direction of flow over the serrations with a desired direction of flow. The desired direction of flow is generally in line with a transverse or chordal direction of flow over the wind turbine blade.

It will be understood that flow straightening vanes may be provided on each trailing edge serration of a wind turbine blade. Alternatively, it will be understood that flow straightening vanes may be provided on a portion or subset of the plurality of trailing edge serrations of a wind turbine blade, for example in spanwise sections of the blade where it is desired to ensure straightened flow over blade serrations. Preferably, flow straightening vanes are provided on serrations located in the outboard portion of the wind turbine blade.

Preferably, said at least one flow straightening vane projects substantially perpendicularly from the surface of said serrations, in a flapwise direction. Preferably, said at least one flow straightening vane comprises a substantially planar projection, said substantially planar projection extending in a substantially transverse or chordal direction, preferably aligned with a desired local direction of flow over the wind turbine blade.

Preferably, said serrations are arranged at incidence to the flow over the wind turbine blade, i.e. at an angle to the flow direction over the blade at the trailing edge of the blade. In one aspect, said serrations are angled towards the pressure side of the wind turbine blade. Preferably, said serrations are angled to the flow direction over the wind turbine blade at an angle of between 0-45 degrees to the flow direction, preferably between 1-25 degrees.

Preferably, said at least one flow straightening vane has a height above said surface of said serrations approximately equivalent to a local boundary layer thickness at said at least one flow straightening vane.

As the vanes are substantially equal to the height of the boundary layer at the location of the vanes, accordingly the boundary layer flow is retained in a relatively straight flow direction over the serrations. It will be understood that the boundary layer height may vary along the length of the blade, dependent on blade design factors.

For example, for a known blade such as the 48.7 meter-long blade available from General Electric Company, the calculated local boundary layer thickness with the blade operating at rated rpm will vary chordwise and spanwise over the blade from about 1 millimetre to about 202 millimetres. At 60% chord from the leading edge of the suction side of such a blade 20, the boundary layer thickness is typically between about 6 millimetres and 52 millimetres. At roughly the same chord position for the outer 33% of the suction side of the span, the boundary layer thickness can range from about 6 millimetres to about 16 millimetres.

The boundary layer thickness for the area close to the trailing edge of the blade can be between approximately 6 millimetres to approximately 50 millimetres. Preferably, the boundary layer thickness is within the range of approximately 20-50 millimetres.

Preferably, said at least one flow straightening vane projects from a pressure-side surface of said serration. Additionally or alternatively, said at least one flow straightening vane projects from a suction-side surface of said serration.

Accordingly, it will be understood that the vanes may be provided on one side of the serrations, or on both sides.

Preferably, said at least one flow straightening vane projects from an end of said serrations.

As the vanes project at least partially into the wake of the serrations, the flow straightening effect continues after air flow has left the serration surface. Accordingly, the vanes act to reduce trailing edge vortices, which can have a detrimental effect on operational noise produced by the wind turbine blade.

Preferably, said at least one flow straightening vane projects from an end of said serrations by a length corresponding to the height of the boundary layer at the location of the vanes. In an additional or alternative aspect, said at least one flow straightening vane projects from an end of said serrations by a length corresponding to approximately ⅓ of the length of the serration from a base of the serration to the apex or tip of the serration (that the vane projects from).

Preferably, said vanes are formed from a plastic material.

Preferably, the wind turbine blade comprises at least one trailing edge serration, wherein a pair of flow straightening vanes project from a surface of said at least one trailing edge serration.

By arranging a pair of flow straighteners on a serration, an effective flow channel can be created on the serration to ensure a straight flow direction, minimizing or eliminating lateral flow.

Preferably, said pair of flow straightening vanes are arranged on said at least one trailing edge serration wherein said vanes are approximately equidistantly spaced from a centerline of said at least one trailing edge serration.

It will be understood that the centreline comprises a notional line extending from the midpoint of the base of said serration to the apex or tip of said serration.

Preferably, said pair of flow straightening vanes are spaced from each other on said trailing edge serration in the spanwise direction of the blade by a distance equal to approximately half of the width of said trailing edge serration measured in the spanwise direction.

In one aspect, the flow straightening vanes are formed integrally with said serrations.

In an alternative aspect, the flow straightening vanes are provided as add-on elements which can be attached to existing serrations, for example as a retrofit solution. The elements may be attached using any suitable mechanism, for example adhesive bonding and/or a snap-fit or clip-on interlocking connection.

Preferably, a leading-edge-side of said at least one flow straightening vane tapers in the direction of the leading edge of the blade.

Preferably, a trailing-edge-side of said at least one flow straightening vane tapers in the direction of flow over the blade.

By tapering either one or both of the ends of the vanes, the negative aerodynamic impact of the use of the vanes is minimized.

There is further provided a wind turbine comprising at least one of the blades as described above.

There is also provided a serrated panel for a wind turbine blade, the panel arranged to be attached to the trailing edge of a blade to form a plurality of serrations at the trailing edge of the blade,
wherein the panel further comprises at least one flow straightening vane projecting from a surface of said serrations, said at least one flow straightening vane arranged to straighten flow over said surface of said serrations.

DESCRIPTION OF THE INVENTION

Figure 1:
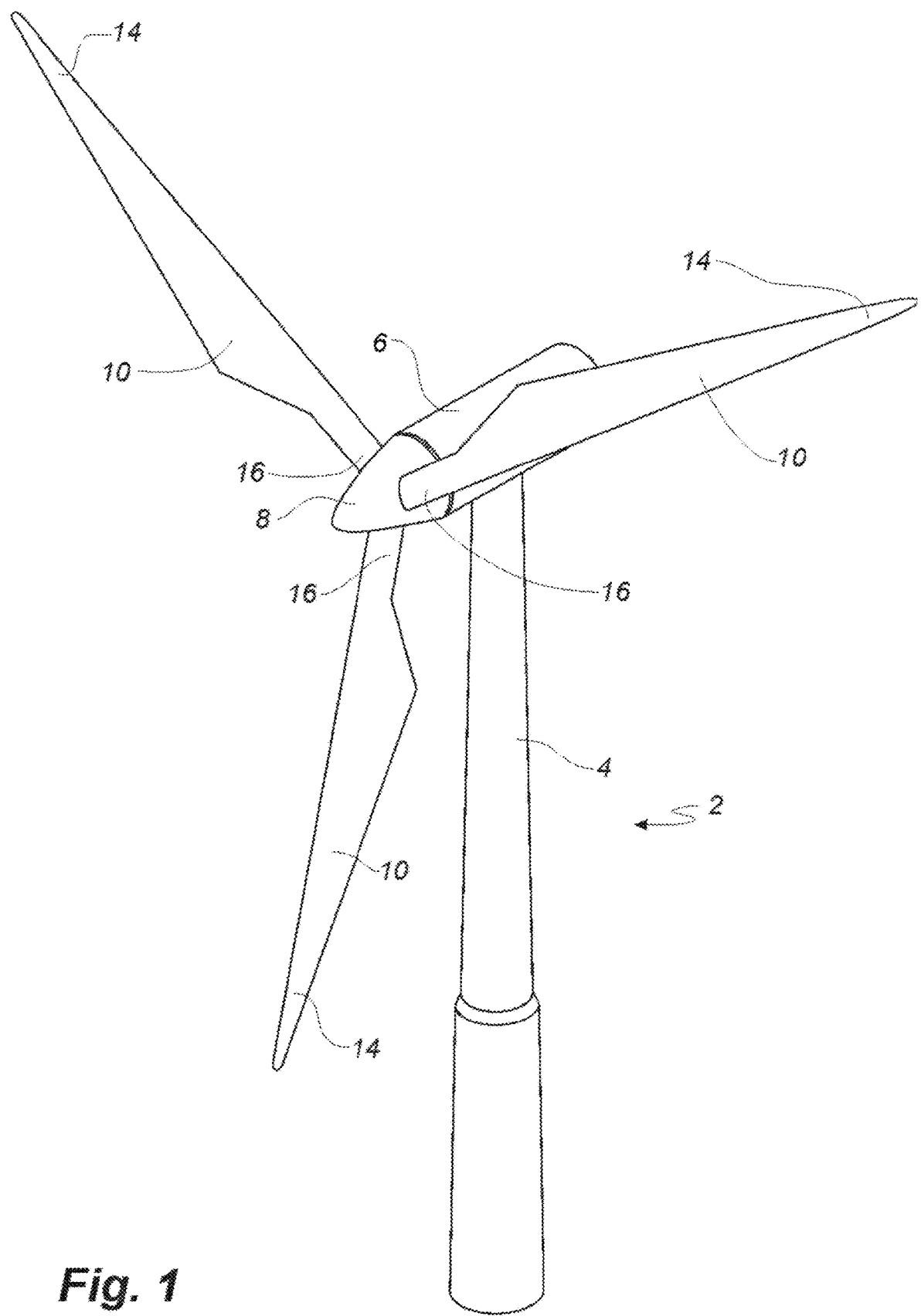
Figure 2:
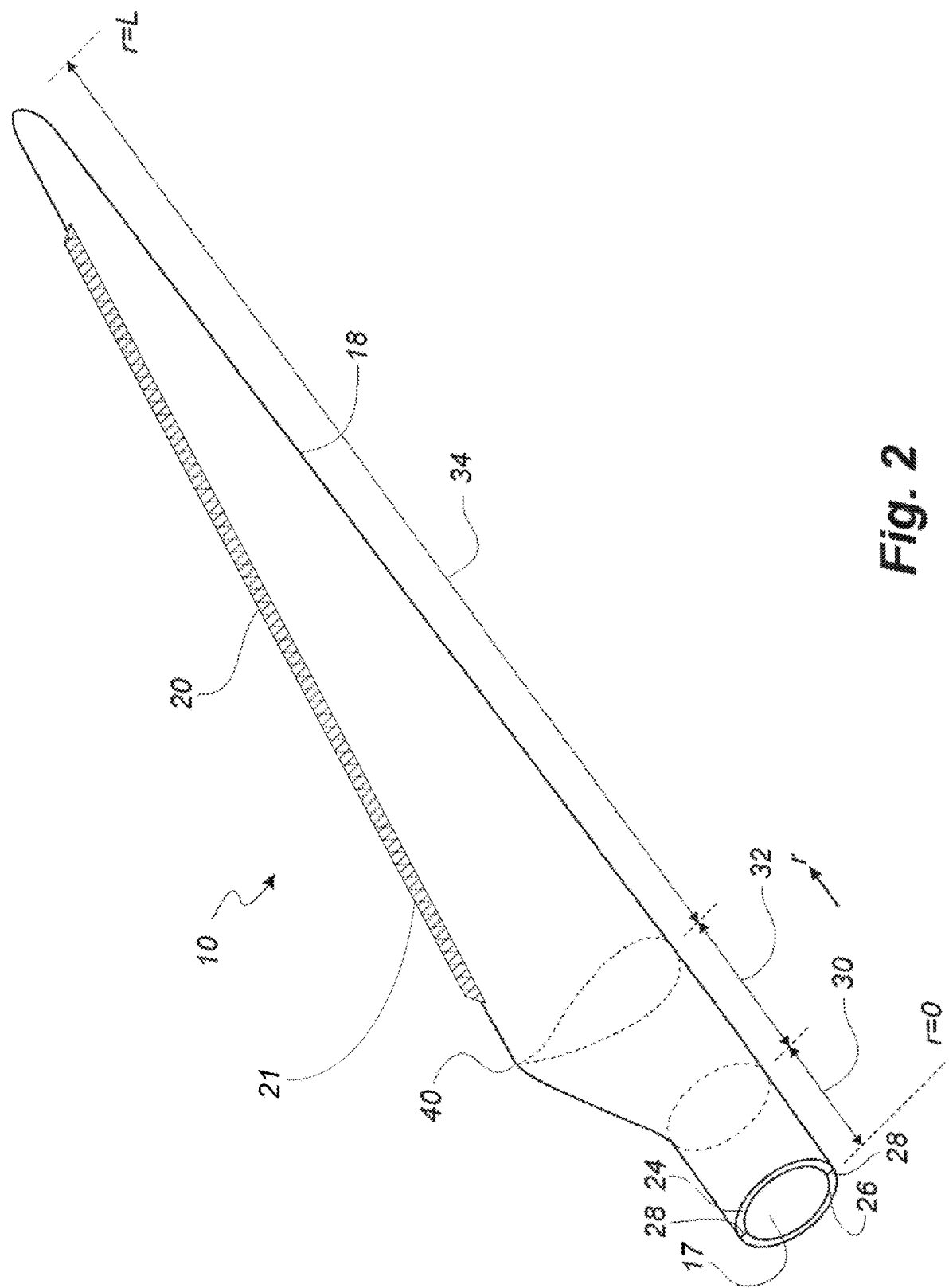
Figure 6:
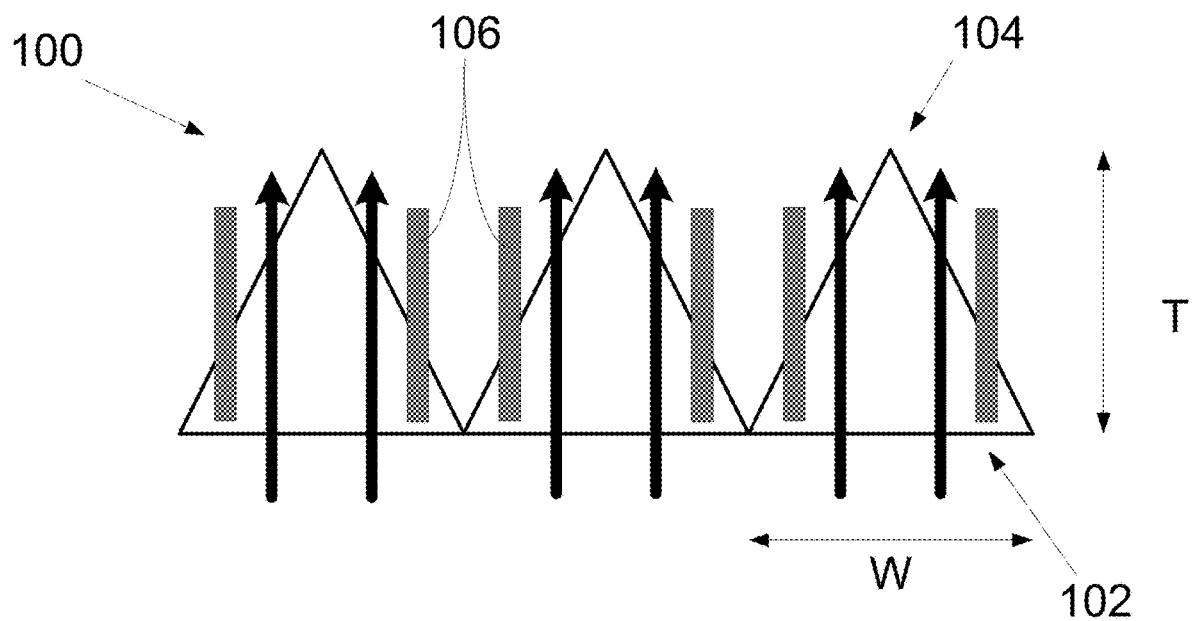
Figure 7:
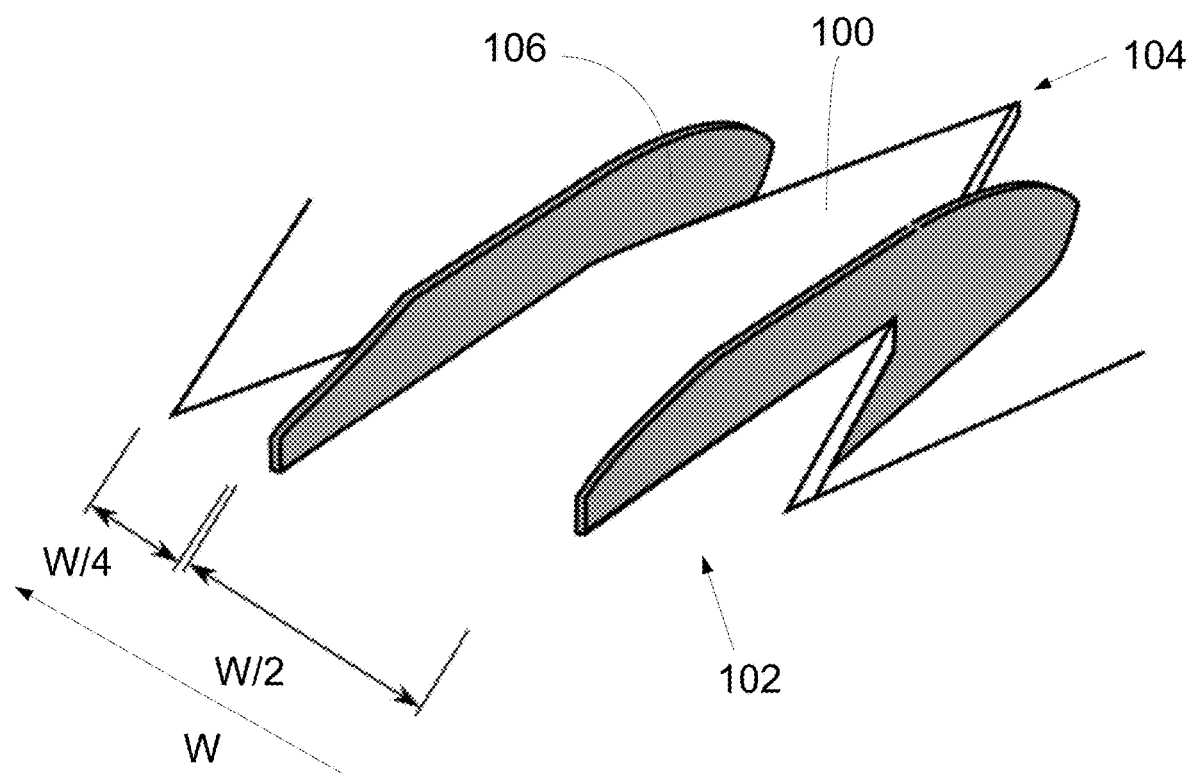
Figure 8:
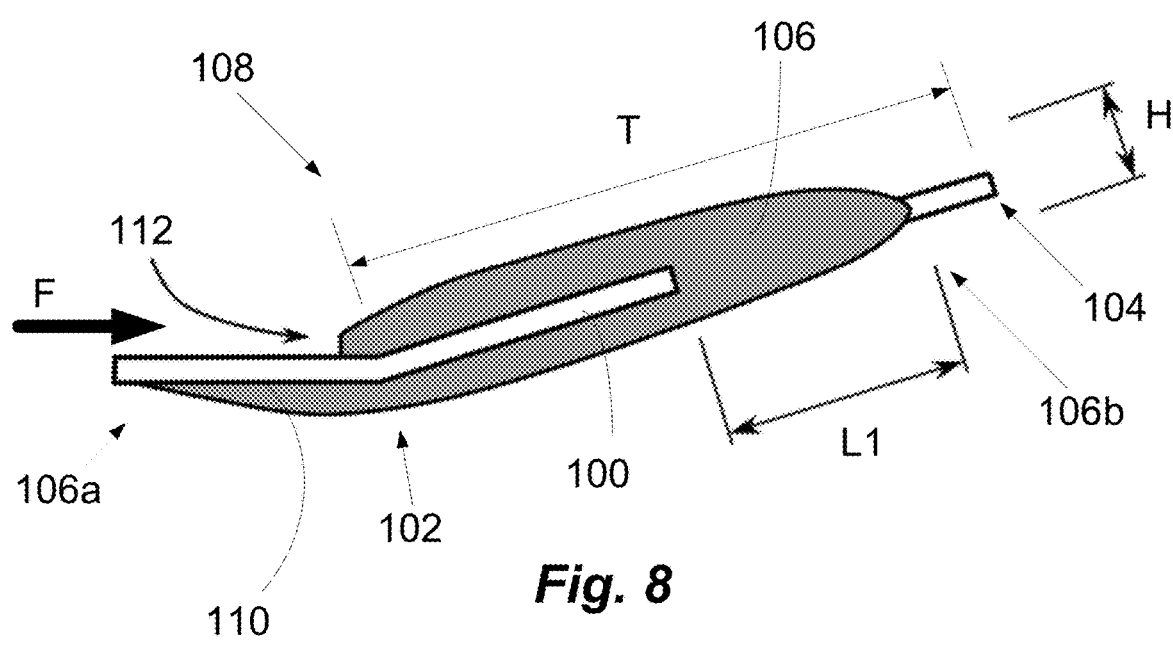

Embodiments of the invention will now be described, by way of example only, with reference to the accompanying drawings, in which:

FIG. 1 shows a wind turbine;
FIG. 2 shows a schematic view of a wind turbine blade according to the invention;
FIG. 3 shows a schematic view of an airfoil profile of the blade of FIG. 2;
FIG. 4 shows a schematic view of the wind turbine blade of FIG. 2, seen from above and from the side;
FIG. 5 illustrates flow over a prior art set of trailing edge serrations;
FIG. 6 illustrates flow over a set of trailing edge serrations according to the invention;
FIG. 7 illustrates an isometric perspective view of a serration of FIG. 6;

FIG. 8 illustrates a side plan view of a serration of FIG. 6; and
FIG. 9 illustrates side plan views of a plurality of different flow straightening vanes shapes according to different embodiments of the invention.

It will be understood that elements common to the different embodiments of the invention have been provided with the same reference numerals in the drawings.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8, the blade extending in a spanwise direction between the root 16 and the tip 14. The rotor has a radius denoted R.

FIG. 2 shows a schematic view of a wind turbine blade 10. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18. An array of trailing edge serrations 21 are provided along a portion of the trailing edge 20 of the blade. In general, flow of air over the wind turbine blade 10 extends from the leading edge 18 to the trailing edge 20 in a generally transverse or chordwise direction.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 is typically constant along the entire root area 30. The transition region 32 has a transitional profile 42 gradually changing from the circular or elliptical shape 40 of the root region 30 to the airfoil profile 50 of the airfoil region 34. The chord length of the transition region 32 typically increases substantially linearly with increasing distance r from the hub.

The airfoil region 34 has an airfoil profile 50 with a chord extending between the leading edge 18 and the trailing edge 20 of the blade 10. The width of the chord decreases with increasing distance r from the hub.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c. Thus, a local relative blade thickness t/c is given as the ratio between the local maximum thickness t and the local chord length c. Further, the position $d_p$ of the maximum pressure side camber may be used as a design parameter, and of course also the position of the maximum suction side camber.

FIG. 4 shows some other geometric parameters of the blade. The blade has a total blade length L. As shown in FIG. 2, the root end is located at position r=0, and the tip end located at r=L. The shoulder 40 of the blade is located at a position r=$L_w$, and has a shoulder width W, which equals the chord length at the shoulder 40. The diameter of the root is defined as D. Further, the blade is provided with a pre-bend, which is defined as Δy, which corresponds to the out of plane deflection from a pitch axis 22 of the blade.

The wind turbine blade 10 generally comprises a shell made of fibre-reinforced polymer, and is typically made as a pressure side or upwind shell part 24 and a suction side or downwind shell part 26 that are glued together along bond lines 28 extending along the trailing edge 20 and the leading edge 18 of the blade 10. Wind turbine blades are generally formed from fibre-reinforced plastics material, e.g. glass fibres and/or carbon fibres which are arranged in a mould and cured with a resin to form a solid structure. Modern wind turbine blades can often be in excess of 30 or 40 metres in length, having blade root diameters of several metres. Wind turbine blades are generally designed for relatively long lifetimes and to withstand considerable structural and dynamic loading.

With reference to FIG. 6, an enlarged view of a plurality of serrations 100 of the serrated trailing edge 21 are shown. The serrations 100 comprise a base end 102 which is arranged at the trailing edge 20 of the wind turbine blade 10, and a tip end 104 which extends downwind of the blade trailing edge 20. The illustrated serrations are substantially planar, but it will be understood that the serrations may vary in depth or thickness, in particular having tapered or chamfered edges. The serrations 100 are shown as having a profile substantially corresponding to an isosceles triangle, but it will be understood that other serration shape profiles may be used, e.g. curved or wave-shaped profiles, crenelated edges, etc.

The serrations 100 are provided with flow straightening vanes 106, which project from surfaces of the serrations 100. The vanes 106 act as barriers to prevent lateral or side flow over the edges of the serrations 100, resulting in straightened airflow over the serrations 100, as indicated by the arrows in FIG. 6.

Preferably, a pair of flow straightener vanes 106 are used for each serration 100, which can act to form an effective flow channel on the serration 100, but it will be understood the any number of vanes 106 may be used for each serration 100, e.g. 1, 3, 4, 5, etc. vanes per serration.

With reference to FIGS. 7 and 8, the flow straightening vanes 106 are arranged to project from opposite surfaces of the serrations 100, and accordingly project on both the pressure side 24 and the suction side 26 of the wind turbine blade 10. In addition, the flow straightener vanes 106 are arranged to project from the end of the serrations 100 downwind of or in the wake of the serrations 100. It will be understood that, for alternative embodiments of the invention, the vanes 106 may be arranged to project from a single side of the serrations 100, and may or may not project from the end of the serrations 100.

Preferably, the vanes project from an end of said serrations 100 by a length L1 corresponding to approximately ⅓ of the total length T of the serration 100, the total length T taken from a base of the serration to the apex or tip of the serration.

Preferably, the height of the vanes 106 above the surface of the serrations 100 is selected to be substantially equivalent to the height of the boundary layer over the wind turbine blade 10 local to the vaned serrations 100.

In some embodiments, the vanes 100 can be selected to have a uniform height to ensure that the vanes will approximate or exceed boundary layer height for at least a majority of the locations along the blade 10 where the vaned serrations are located. Alternatively, as the boundary layer height may vary along the length of the blade, dependent on blade design factors, the height of the vanes 106 may vary along the spanwise direction of the blade 10.

For example, for a known blade such as the 48.7 meter-long blade available from General Electric Company, the calculated local boundary layer thickness with the blade operating at rated rpm will vary chordwise and spanwise over the blade from about 1 millimetre to about 202 millimetres. At 60% chord from the leading edge of the suction side of such a blade 20, the boundary layer thickness is typically between about 6 millimetres and 52 millimetres. At roughly the same chord position for the outer 33% of the suction side of the span, the boundary layer thickness can range from about 6 millimetres to about 16 millimetres. At the trailing edge of the blade, the boundary layer thickness can be between approximately 6 millimetres to approximately 50 millimetres, preferably, within the range of approximately 20-50 millimetres.

For the embodiment shown in FIGS. 7 and 8, as the vanes 106 project from both sides of the serrations 100, the combined height H is substantially equivalent to the height of the boundary layer on both the pressure- and suction-side of the serrations 100.

The vanes 106 are preferably symmetrically arranged on the serrations 100, at an equal distance on either side of the centreline of the serrations 100, the centreline defined as a notional line extending from the midpoint of the base 102 of a serration to the tip 104 of the serration. Preferably, the vanes 106 are spaced from the centreline approximately one quarter of the width W measured at the base 102 of the serration, such that the distance between vanes 106 on a serration 100 is approximately W/2.

The side profile of the vanes 106 may be shaped based on the aerodynamic design requirement. In the embodiment shown, the leading-edge-facing side 106a of the vanes 06 tapers towards the surface of the serrations and/or the wind turbine blade, such that any negative aerodynamic effects which may be introduced by the use of additional components is minimised. In addition, the trailing-edge-facing side 106b which is arranged towards the wake of the wind turbine blade tapers towards a point or edge.

In the embodiment illustrated in FIG. 8, the serrations 100 are provided as part of a trailing edge panel 108 for attachment to the trailing edge 20 of a wind turbine blade 10. The panel 108 comprises a base section 110 for attachment to the blade 10, with the serrations 100 arranged at an angle to the base section 110 such that the serrations 100 are arranged at incidence to the air flow over the wind turbine blade 10, the direction of air flow over the wind turbine blade generally indicated by the arrow F. The vanes 106 may be shaped to accommodate the trailing edge 20 of the blade 10. For example, in FIG. 8, on a first side of the panel 108 the vanes 106 extend around a bend in the panel 108 and extend onto the base section 110 of the panel 108. On the opposite side, which is used to attach the based section 110 to the blade 10, the leading-edge-side 106a of the vanes may be provided with a step end 112 so that as the panel 108 is mounted to the blade 10, the leading-edge-side 106a of the vanes 106 on that side are substantially flush with the surfaces at the trailing edge 20 of the wind turbine blade 10. In this regard, the step end 112 may be dimensioned to correspond with the thickness of the trailing edge 20 of the wind turbine blade 10.

While the flow straightening vanes 106 may be formed integrally as part of the serrations 106, e.g. as part of a moulding process, in further aspects the flow straightening vanes 106 may be provided as separate add-on elements which can be attached to serrations 100. The add-ons may be provided as slotted elements which can be slid onto a serration from the end of the serration, and may be secured to the serration using any suitable means, e.g. adhesive bonding and/or a mechanical clip-on or snap-fit connection, based on interlocking elements provided on the serration and the add-ons.

While FIGS. 7 and 8 show a particular design of vanes 106, it will be understood that different geometries may be used for different embodiments of the invention, to provide different aerodynamic effects. With reference to FIG. 9, different sample geometries are shown. The different geometries each show a slot aperture at the leading-edge-side to receive or be fitted over a portion of a serration, and a trailing edge side to be arranged towards the wake of a wind turbine blade.

Figure 9A:
Figure 9B:
Figure 9C:

FIG. 9(a) shows a vane design having an elongated hexagonal profile. FIG. 9(b) illustrates a vane similar to FIG. 9(a), having a flat trailing-edge-side. FIG. 9(c) shows a further variation on FIG. 9(b), where the trailing-edge-side comprises a notched profile. In addition, it will be understood that the edges of the vanes may comprise tapered or chamfered corners. In a further aspect, while the vanes illustrated in the figures are substantially planar elements, it will be understood that the vanes may be shaped along the longitudinal extent of the vanes, e.g. curved vanes, etc.

By providing flow straighteners for use in combination with trailing edge serrations, the aerodynamic flow over the serrations is maintained in designed-for orientations, thereby improving the effectiveness of the serrated trailing edge.

The invention is not limited to the embodiments described herein, and may be modified or adapted without departing from the scope of the present invention.

The invention claimed is:

1. A wind turbine blade (10) having a profiled contour including a pressure side and a suction side, and a leading edge (18) and a trailing edge (20) with a chord having a chord length extending therebetween, the wind turbine blade (10) extending in a spanwise direction between a root end and a tip end, the wind turbine blade (10) comprising a plurality of serrations (100) provided along at least a portion of the trailing edge (20) of the wind turbine blade (10), wherein each said serration (100) is planar with a uniform thickness, each said serration (100) comprising a base (102) proximal to the trailing edge (20) of the wind turbine blade (10) and an apex (104) distal to the trailing edge (20) of the wind turbine blade (10) with a notional line extending from a midpoint of the base (102) to the apex (104), and wherein the wind turbine blade (10) further comprises at least one flow straightening vane (106) projecting from a surface of said serrations (100), said at least one flow straightening vane (106) being arranged to straighten flow over said surface of said serrations (100), wherein the at least one flow straightening vane (106) is arranged spaced from the notional line, said at least one flow straightening vane (106) comprising at least a selected flow straightening vane projecting from a selected one of the plurality of serrations (100), the selected flow straightening vane being spaced from the notional line of the selected one of the plurality of serrations (100), and wherein the at least one flow straightening vane (106) comprises a flat planar element extending in a chordal direction and projecting normally with respect to the surface of said serrations (100).

2. The wind turbine blade (10) of claim 1, wherein said at least one flow straightening vane (106) projects perpendicularly from the surface of said serrations (100), in a flapwise direction.

3. The wind turbine blade (10) of claim 1, wherein said serrations (100) are arranged at incidence to the flow over the wind turbine blade (10).

4. The wind turbine blade (10) of claim 1, wherein said at least one flow straightening vane (106) has a height above said surface of said serrations (100) equivalent to a local boundary layer thickness at said at least one flow straightening vane (106).

5. The wind turbine blade (10) of claim 1, wherein said at least one flow straightening vane (106) projects from a pressure-side surface of said serrations (100) and a suction-side surface of said serrations (100).

6. The wind turbine blade (10) of claim 1, wherein said at least one flow straightening vane (106) projects from an end of said serrations (100).

7. The wind turbine blade (10) of claim 6, wherein said at least one flow straightening vane (106) projects from the end of said serrations (100) by a length corresponding to a local boundary layer thickness at said at least one flow straightening vane (100).

8. The wind turbine blade (10) of claim 1, wherein the plurality of serrations (100) comprise at least one trailing edge serration (100), and wherein the at least one flow straightening vane (106) comprises a plurality of flow straightening vanes (106), a pair of the flow straightening vanes (106) projecting from a surface of said at least one trailing edge serration (100).

9. The wind turbine blade (10) of claim 8, wherein said pair of flow straightening vanes (106) are arranged on said at least one trailing edge serration (100) wherein said pair of flow straightening vanes (106) are equidistantly spaced from a centerline of said at least one trailing edge serration (100).

10. The wind turbine blade (10) of claim 9, wherein said pair of flow straightening vanes (106) are spaced apart from each other on said at least one trailing edge serration (100)

in the spanwise direction of the wind turbine blade (10) by a distance (W/2) equal to half of a width (W) of said at least one trailing edge serration (100) measured in the spanwise direction.

11. The wind turbine blade (10) of claim 1, wherein said flow straightening vanes (106) are formed integrally with said serrations (100).

12. The wind turbine blade (10) of claim 1, wherein said flow straightening vanes (106) are attached to said serrations (100) using adhesive bonding and/or a snap-fit or clip-on interlocking connection.

13. The wind turbine blade (10) of claim 1, wherein a leading-edge-side (106a) of said at least one flow straightening vane (100) tapers in the direction of the leading edge of the wind turbine blade (10).

14. The wind turbine blade (10) of claim 1, wherein a trailing-edge-side (106b) of said at least one flow straightening vane (100) tapers in the direction of flow over the wind turbine blade (10).

15. The wind turbine blade (10) of claim 1, wherein the at least one flow straightening vane (106) projects in a direction normal to the surface of said serrations (100).

16. A wind turbine comprising at least one wind turbine blade (10) as claimed in claim 1.

17. A serrated panel (108) for a wind turbine blade (10), the serrated panel (108) arranged to be attached to a trailing edge of the wind turbine blade (10) to form a plurality of serrations (100) at the trailing edge of the wind turbine blade, each said serration (100) comprising a base (102) proximal to the trailing edge (20) of the wind turbine blade (10) and an apex (104) distal to the trailing edge (20) of the wind turbine blade (10) with a notional line extending from a midpoint of the base (102) to the apex (104), wherein the serrated panel (108) further comprises at least one flow straightening vane (106) projecting from a surface of said serrations (100), said at least one flow straightening vane (100) arranged to straighten flow over said surface of said serrations (100), wherein the at least one flow straightening vane (106) is arranged spaced from the notional line, said at least one flow straightening vane (106) comprising at least a selected flow straightening vane projecting from a selected one of the plurality of serrations (100), the selected flow straightening vane being spaced from the notional line of the selected one of the plurality of serrations (100), and wherein the at least one flow straightening vane (106) comprises a flat planar element extending in a chordal direction and projecting normally with respect to the surface of said serrations (100).

18. A wind turbine blade (10) having a profiled contour including a pressure side and a suction side, and a leading edge (18) and a trailing edge (20) with a chord having a chord length extending therebetween, the wind turbine blade (10) extending in a spanwise direction between a root end and a tip end, the wind turbine blade (10) comprising a plurality of serrations (100) provided along at least a portion of the trailing edge (20) of the wind turbine blade (10), wherein each said serration (100) is planar with a uniform thickness, and wherein the wind turbine blade (10) further comprises at least one flow straightening vane (106) projecting from a surface of said serrations (100), said at least one flow straightening vane (106) being arranged to straighten flow over said surface of said serrations (100), said at least one flow straightening vane (106) projecting from a pressure-side surface of said plurality of serrations (100) and a suction-side surface of said plurality of serrations (100), and wherein the at least one flow straightening vane (106) comprises a flat planar element extending in a chordal direction and projecting normally with respect to the surface of said serrations (100).

* * * * *